United States Patent
Hanazato

(10) Patent No.: US 7,570,807 B2
(45) Date of Patent: Aug. 4, 2009

(54) IMAGE PROCESSING APPARATUS, IMAGE FORMING SYSTEM, COMPUTER READABLE MEDIUM STORING PROGRAM AND IMAGE PROCESSING METHOD

(75) Inventor: Eiichi Hanazato, Ebina (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 11/819,087

(22) Filed: Jun. 25, 2007

(65) Prior Publication Data

US 2008/0129746 A1 Jun. 5, 2008

(30) Foreign Application Priority Data

Dec. 1, 2006 (JP) ............................. 2006-325475

(51) Int. Cl.
*G06K 9/00* (2006.01)
*G06K 9/54* (2006.01)
*G06K 15/00* (2006.01)
*H04N 1/387* (2006.01)

(52) U.S. Cl. .................. 382/162; 382/302; 358/1.9; 358/3.28; 358/450

(58) Field of Classification Search ............ 358/1.9, 358/2.1, 518, 505, 501, 3.1, 3.21, 3.27, 3.28, 358/1.16, 450, 462; 382/162, 167, 194, 302
See application file for complete search history.

(56) References Cited

U.S. PATENT DOCUMENTS

| | | | | |
|---|---|---|---|---|
| 4,737,921 A | * | 4/1988 | Goldwasser et al. | 345/421 |
| 5,594,850 A | * | 1/1997 | Noyama et al. | 345/632 |
| 6,977,754 B2 | * | 12/2005 | Matsumoto et al. | 358/1.9 |
| 2005/0041132 A1 | * | 2/2005 | Juen et al. | 348/333.12 |
| 2005/0280659 A1 | * | 12/2005 | Paver | 345/629 |
| 2006/0052702 A1 | * | 3/2006 | Matsumura et al. | 600/443 |
| 2007/0223877 A1 | * | 9/2007 | Kuno | 386/95 |

FOREIGN PATENT DOCUMENTS

| | | | |
|---|---|---|---|
| JP | 401244858 | * | 9/1989 |
| JP | A 8-18767 | | 1/1996 |

* cited by examiner

*Primary Examiner*—Jerome Grant, II
(74) *Attorney, Agent, or Firm*—Oliff & Berridge, PLC

(57) ABSTRACT

An image processing apparatus includes: a storage unit that stores image information on which additional information is to be overlaid; a change unit that changes pixels, within a predetermined range of respective pixels constituting the image information, among pixels constituting the additional information, to pixels having a different density or color tint from a density or color tint of the image information and the additional information; and an overlay unit that overlays the additional information changed by the change unit on the image information held in the storage unit.

13 Claims, 19 Drawing Sheets

| DEGREE OF OVERLAY BETWEEN CHARACTER DATA AND STAMP DATA | BOUNDARY PROCESSING METHOD |
|---|---|
| 20% OR LESS | CLEAR STAMP DATA WITHIN 1 BIT AROUND CHARACTER DATA |
| 20%~50 | CLEAR STAMP DATA WITHIN 3 BITS AROUND CHARACTER DATA |
| 50% OR MORE | CLEAR STAMP DATA WITHIN 5 BITS AROUND CHARACTER DATA |

FIG. 1

CHARACTER DATA
60

STAMP MARK DATA
50

AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA
AAAAAAAAAAAAAAAAAAAAAAAA

FIG. 12
CHARACTER DATA
STAMP MARK DATA
CHARACTER-FIRST OVERLAY
TURN 1 BIT ADJACENT TO CHARACTER DATA WHITE

[CHARACTER DATA]

[STAMP MARK DATA]

[CHARACTER-FIRST OVERLAY]

[TURN 1 BIT ADJACENT TO CHARACTER DATA WHITE]

FIG. 16

| STAMP TYPE | SIGNIFICANCE | BOUNDARY PROCESSING METHOD |
|---|---|---|
| CONFIDENTIAL | LOW | CLEAR STAMP DATA WITHIN 3 BITS AROUND CHARACTER DATA |
| CIRCULAR | INTERMEDIATE | CLEAR STAMP DATA WITHIN 1 BIT ON RIGHT AND LEFT SIDES OF CHARACTER DATA |
| REFERENCE | INTERMEDIATE | CLEAR STAMP DATA WITHIN 1 BIT ON RIGHT AND LEFT SIDES OF CHARACTER DATA |
| DIVISION HEAD SEAL | SIGNIFICANT | NOT PROCESS |
| COMPANY SEAL | SIGNIFICANT | NOT PROCESS |

FIG. 17

| DEGREE OF OVERLAY BETWEEN CHARACTER DATA AND STAMP DATA | BOUNDARY PROCESSING METHOD |
|---|---|
| 20% OR LESS | CLEAR STAMP DATA WITHIN 1 BIT AROUND CHARACTER DATA |
| 20%~50 | CLEAR STAMP DATA WITHIN 3 BITS AROUND CHARACTER DATA |
| 50% OR MORE | CLEAR STAMP DATA WITHIN 5 BITS AROUND CHARACTER DATA |

FIG. 18

| COLOR DIFFERENCE | BOUNDARY PROCESSING METHOD |
|---|---|
| COLOR DIFFERENCE BETWEEN STAMP DATA AND CHARACTER DATA IS LESS THAN PREDETERMINED VALUE | CLEAR STAMP DATA WITHIN 7 BITS AROUND CHARACTER DATA |
| COLOR DIFFERENCE BETWEEN STAMP DATA AND CHARACTER DATA IS EQUAL TO OR GREATER THAN PREDETERMINED VALUE | CLEAR STAMP DATA WITHIN 3 BITS ON RIGHT AND LEFT SIDES OF CHARACTER DATA |

FIG. 19

| DENSITY DIFFERENCE | BOUNDARY PROCESSING METHOD |
|---|---|
| LARGE | CLEAR STAMP DATA WITHIN 3 BITS AROUND CHARACTER DATA |
| MIDDLE | CLEAR STAMP DATA WITHIN 5 BITS AROUND CHARACTER DATA |
| SMALL | CLEAR STAMP DATA WITHIN 7 BITS AROUND CHARACTER DATA |

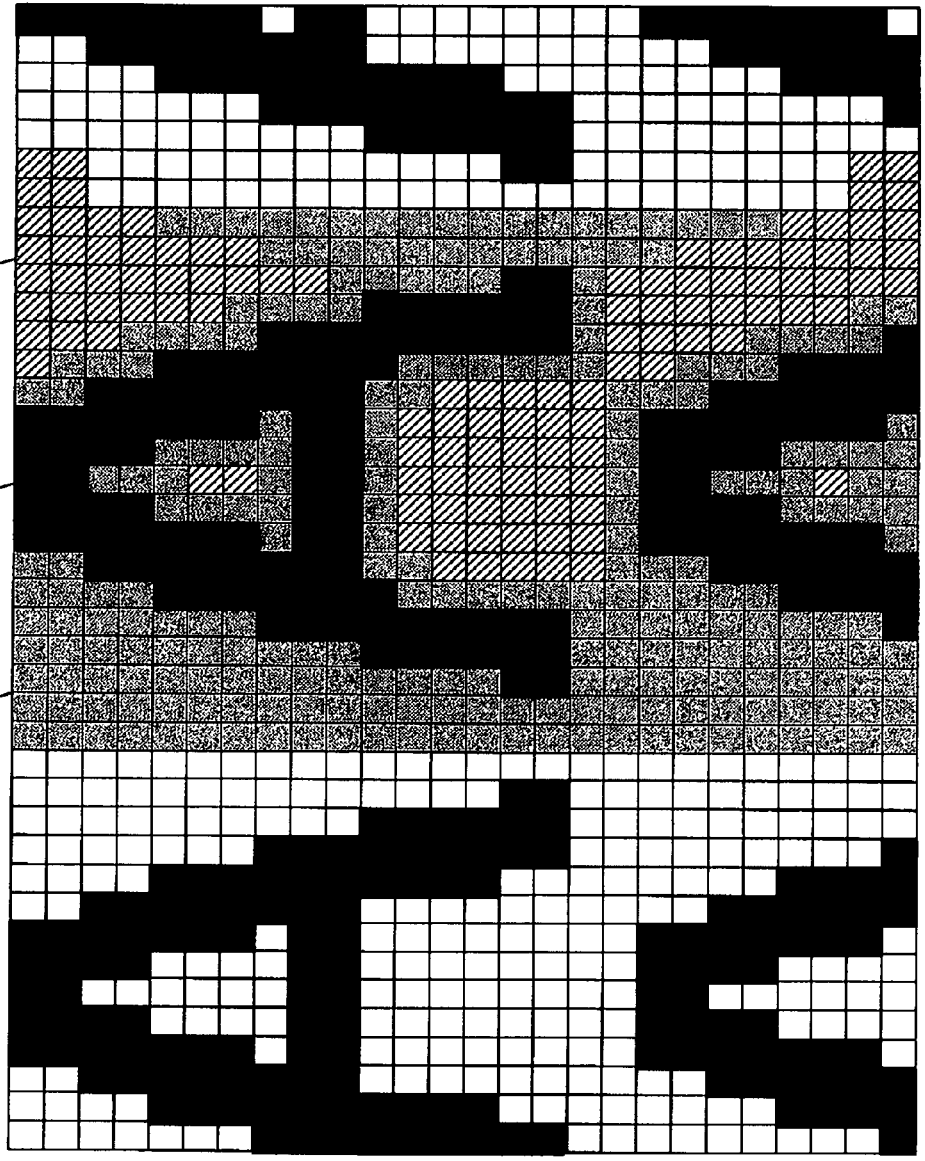

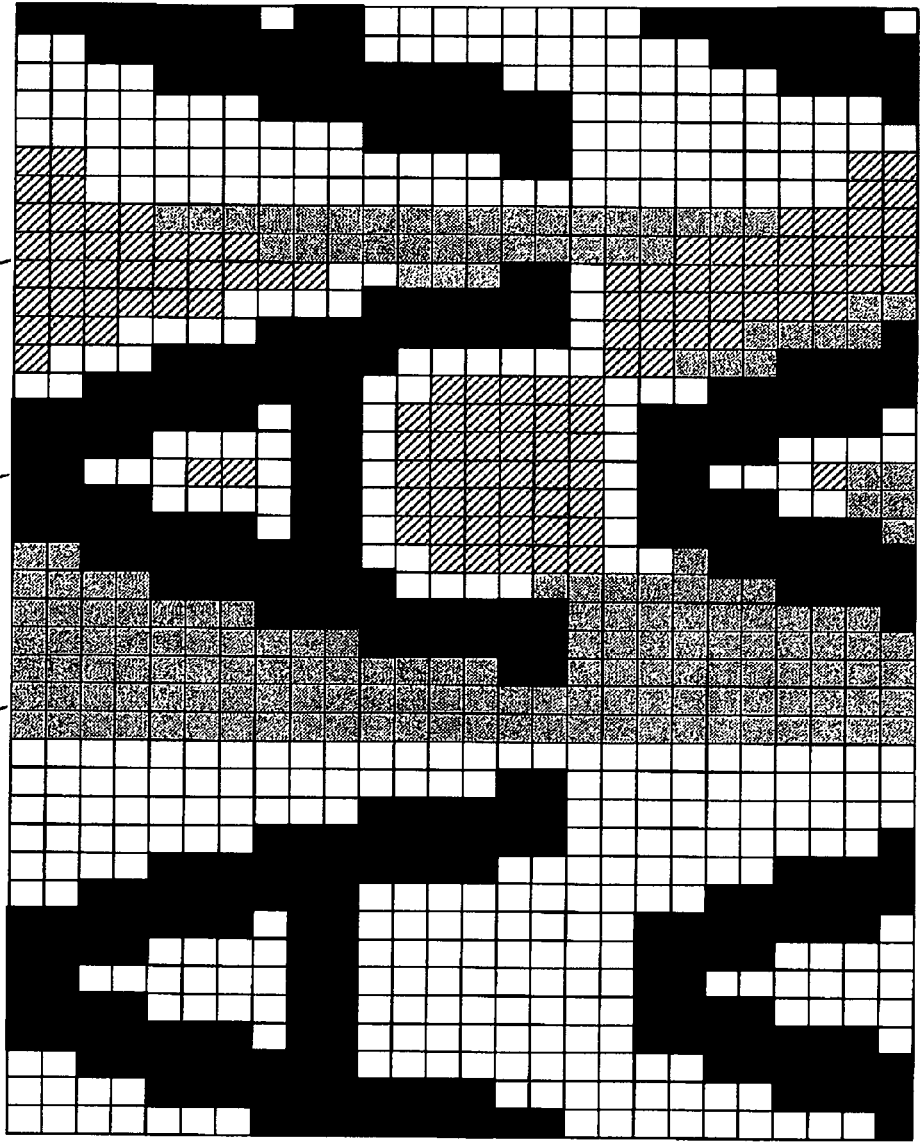

IMAGE PROCESSING APPARATUS, IMAGE FORMING SYSTEM, COMPUTER READABLE MEDIUM STORING PROGRAM AND IMAGE PROCESSING METHOD

CROSS-REFERENCE TO RELATED APPLICATIONS

This application is based on and claims priority under 35 USC 119 from Japanese Patent Application No. 2006-325475 filed Dec. 1, 2006.

BACKGROUND

1. Technical Field

The present invention relates to an image processing apparatus, an image forming system, a computer readable medium storing a program and an image processing method.

2. Related Art

There is disclosed an image processing apparatus in which, when a stamp image is overlaid on image data to be print-outputted, an overlay position of the stamp image can be arbitrarily changed.

SUMMARY

According to the present invention, there is provided an image processing apparatus including: a storage unit that stores image information on which additional information is to be overlaid; a change unit that changes pixels, within a predetermined range of respective pixels constituting the image information, among pixels constituting the additional information, to pixels having a different density or color tint from a density or color tint of the image information and the additional information; and an overlay unit that overlays the additional information changed by the change unit on the image information held in the storage unit.

BRIEF DESCRIPTION OF THE DRAWINGS

Exemplary embodiments of the present invention will be described in detail based on the following figures, wherein:

FIG. 1 is an example of a printout in which stamp mark data 50 indicating a "confidential" mark is overlaid on character data 60;

FIG. 12 is an explanatory view of particular processing performed on a line indicated with an arrow in FIG. 11;

FIG. 16 is an example of a table used in determination of the method for processing the boundary between the stamp mark image and the print data based on stamp data type (significance);

FIG. 17 is an example of a table used in determination of the method for processing the boundary between the stamp mark image and the print data based on a degree of overlay between the character data and the stamp data;

FIG. 18 is an example of a table used in determination of the method for processing the boundary between the stamp mark image and the print data based on a color difference between the character data and the stamp data;

FIG. 19 is an example of a table used in determination of the method for processing the boundary between the stamp mark image and the print data based on a density difference between the character data and the stamp data;

FIG. 21 is an enlarged view of an image in which the stamp mark image is overlaid on the print data in the third exemplary embodiment of the present invention; and FIG. 22 is an enlarged view of another image in which the stamp mark image is overlaid on the print data in the third exemplary embodiment of the present invention.

DETAILED DESCRIPTION

Background

First, to assist understanding of the present invention, the background and outline of the invention will be described.

In an image forming system including a printer or the like having a function of overlaying a stamp mark such as a "confidential" mark or a "duplication prohibited" mark on character data and performing printing, when a stamp mark is overlaid on character data and printing is performed, characters and/or figures of real print data become illegible.

Figure 2:
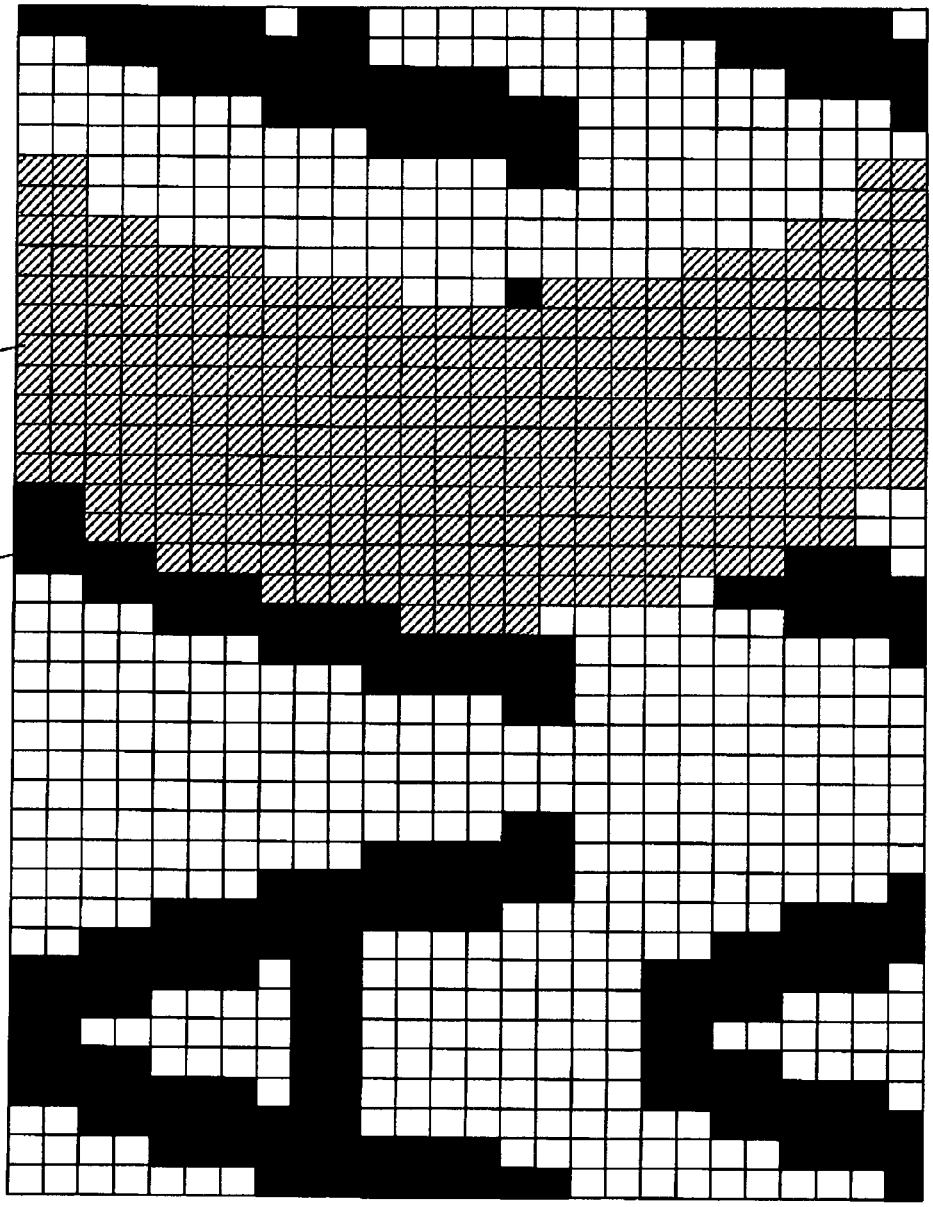
FIG. 2 is an enlarged view of a part of the example in FIG. 1.

For example, as shown in FIG. 1, when "confidential" stamp mark data 50 is overlaid on character data 60 indicating characters "AA . . . A", the character data 60 becomes illegible as shown in an enlarged view of FIG. 2.

Figure 3:
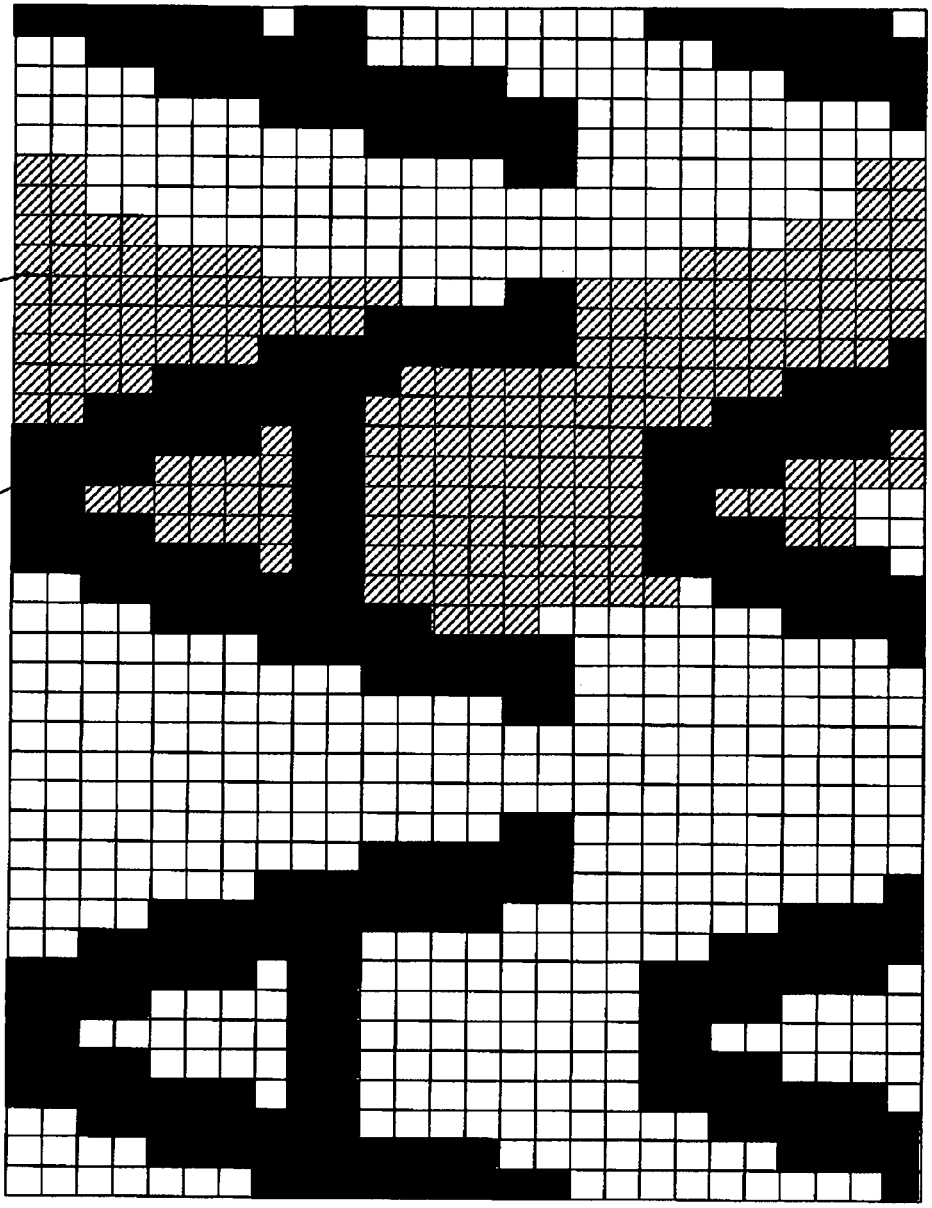
FIG. 3 is an enlarged view in which the character data 60 is overlaid on the stamp mark data 50.

As a method of improving the illegibility of character data, it may be arranged such that the character data is overlaid on the stamp mark and then printing is performed. For example, as shown in FIG. 3, when the character data 60 is overlaid on the stamp mark data 50, the character data 60 becomes legible.

Note that this method is effective when printing colors of the characters and the stamp mark are different (for example, the characters are printed in black and the mark, in red), however, the characters become illegible when the same color is used (for example, when a monochrome printer is used). For example, in FIG. 3, when the character data 60 and the stamp mark data 50 are print-outputted in black, the characters within an area where the stamp mark is overlaid on the character data are illegible.

EXEMPLARY EMBODIMENTS

Next, exemplary embodiments of the present invention will be described in detail based on the drawings.

First Exemplary Embodiment

Figure 4:
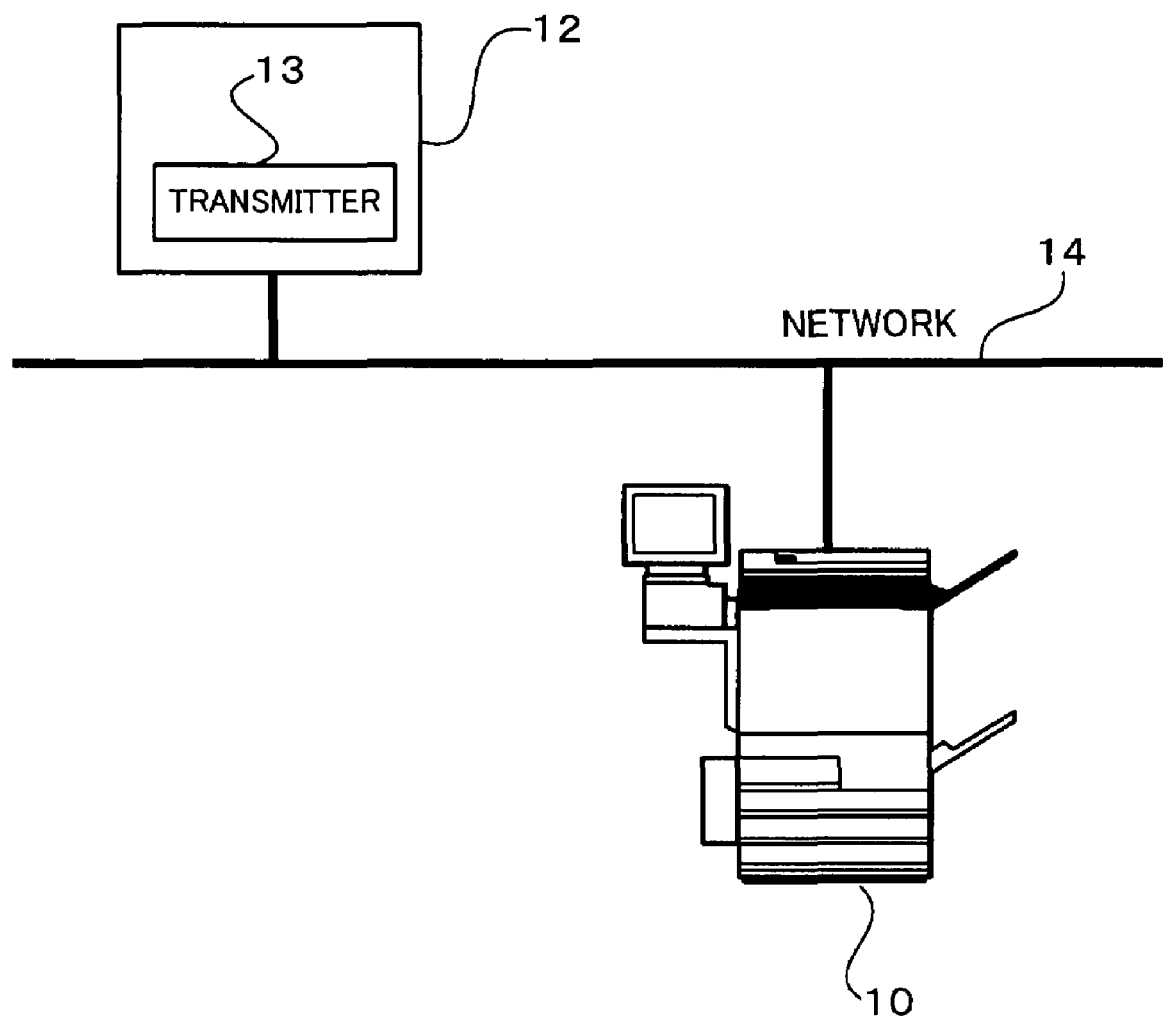
FIG. 4 illustrates a configuration of an image forming system including an image forming apparatus 10 according to a first exemplary embodiment of the present invention.

FIG. 4 illustrates a configuration of an image forming system including an image forming apparatus 10 according to a first exemplary embodiment of the present invention.

As shown in FIG. 4, the image forming system according to the present exemplary embodiment includes the image forming apparatus 10 and a terminal device 12 interconnected via a network 14. The terminal device 12 has a transmitter 13 to generate print data such as a print job and transmit the print data to the image forming apparatus 10. The image forming apparatus 10 receives the print data transmitted from the terminal device 12, and outputs an image corresponding to the print data on a print sheet.

Figure 5:
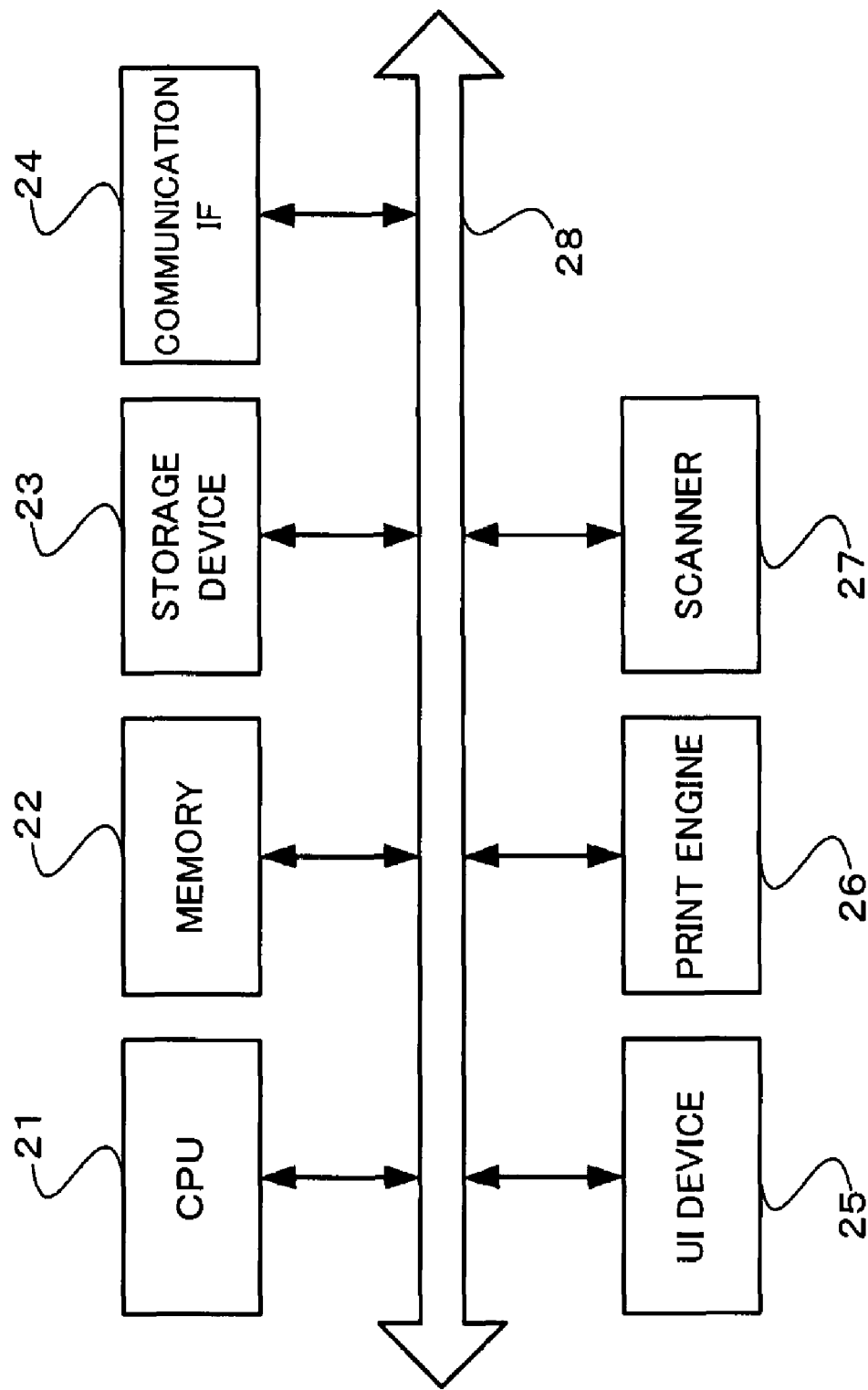
FIG. 5 is a block diagram showing a hardware configuration of the image forming apparatus 10 according to the first exemplary embodiment of the present invention.

Next, FIG. 5 shows a hardware configuration of the image forming apparatus 10 according to the present exemplary embodiment.

As shown in FIG. 5, the image forming apparatus 10 has a CPU 21, a memory 22, a storage device 23 such as a hard disk drive (HDD), a communication interface (IF) 24 to perform data transmission/reception with an external computer or the like via the network 14, a user interface (UI) device 25 including a touch panel or liquid crystal display and a keyboard, a print engine 26, and a scanner 27. These constituent elements are interconnected via a control bus 28.

The CPU 21 performs predetermined processing based on an image processing program stored in the memory 22 or the storage device 23, to control the operation of the image forming apparatus 10.

Figure 6:
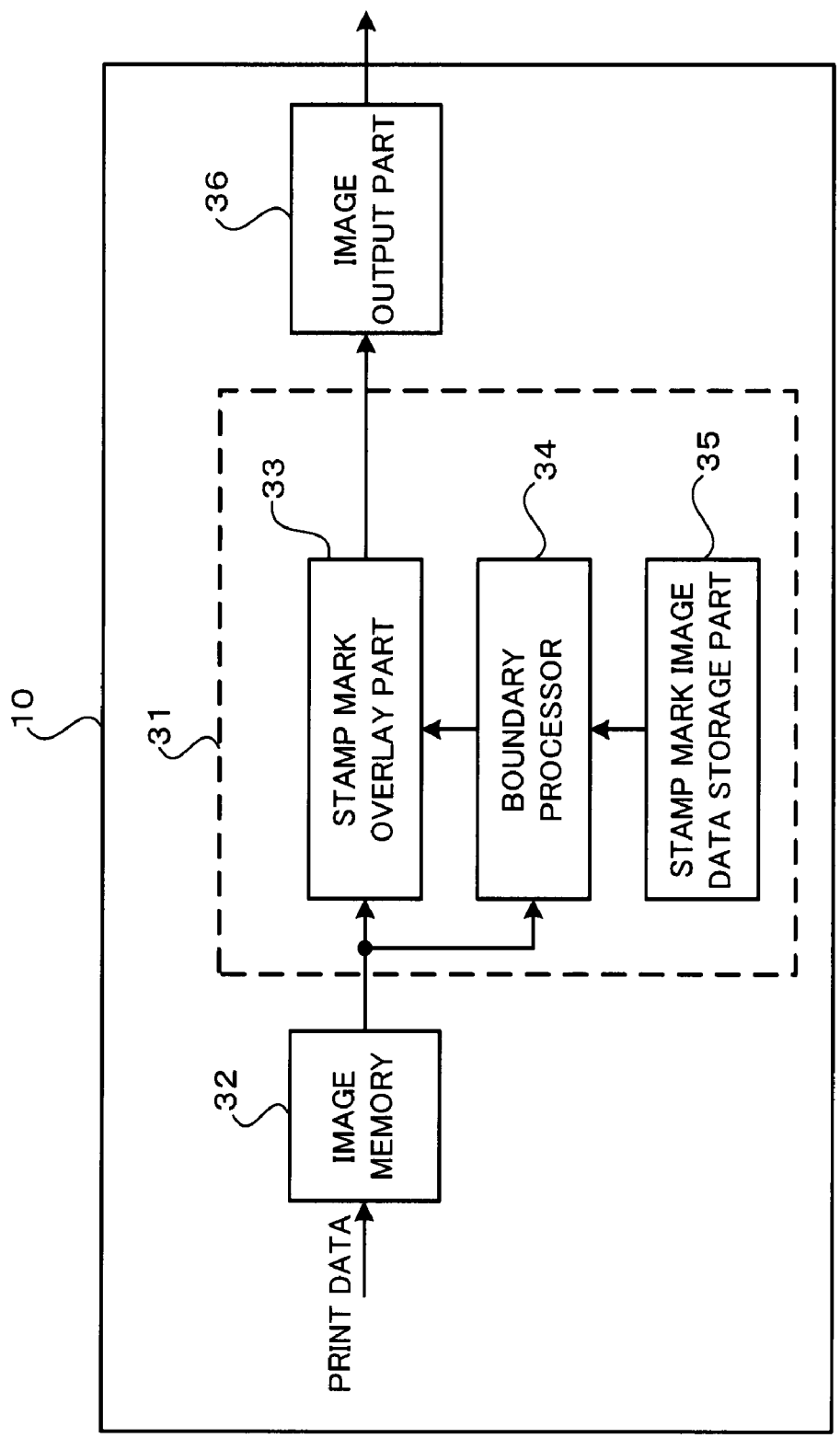
FIG. 6 is a block diagram showing a functional configuration of the image forming apparatus 10 according to the first exemplary embodiment of the present invention.

FIG. 6 is a block diagram showing a functional configuration of the image forming apparatus 10 realized by execution of the above-described image processing program.

As shown in FIG. 6, the image forming apparatus 10 according to the present exemplary embodiment has an image processing device 31, an image memory 32 and an image output part 36.

The image memory 32 is a storage unit for storing print data on which additional information is to be overlaid.

As shown in FIG. 6, the image processing device 31 has a stamp mark overlay part 33, a boundary processor 34, and a stamp mark image data storage part 35.

The stamp mark image data storage part 35 stores data of stamp mark images such as a "confidential" mark, a "duplication prohibited" mark, a "handle with care" mark, and an "ASAP (as soon as possible)" mark.

The boundary processor 34 performs boundary processing to change pixels, within a predetermined range of respective pixels constituting print data, among pixels constituting stamp mark image data, to pixels having a different density or color tint from a density or color tint of the pixels of the stamp mark image data and the print data.

The stamp mark overlay part 33 overlays the stamp mark image data, which has been subjected to the boundary processing by the boundary processor 34, on the print data stored in the image memory 32, and outputs the data to the image output part 36. At this time, the stamp mark overlay part 33 uses an overlay method with preference to the print data over the stamp mark image data.

The image output part 36 outputs an image based on the print data on which the stamp mark has been overlaid by the image processing device 31.

Next, a configuration of the boundary processor 34 in FIG. 6 will be described with reference to FIG. 7.

Figure 7:
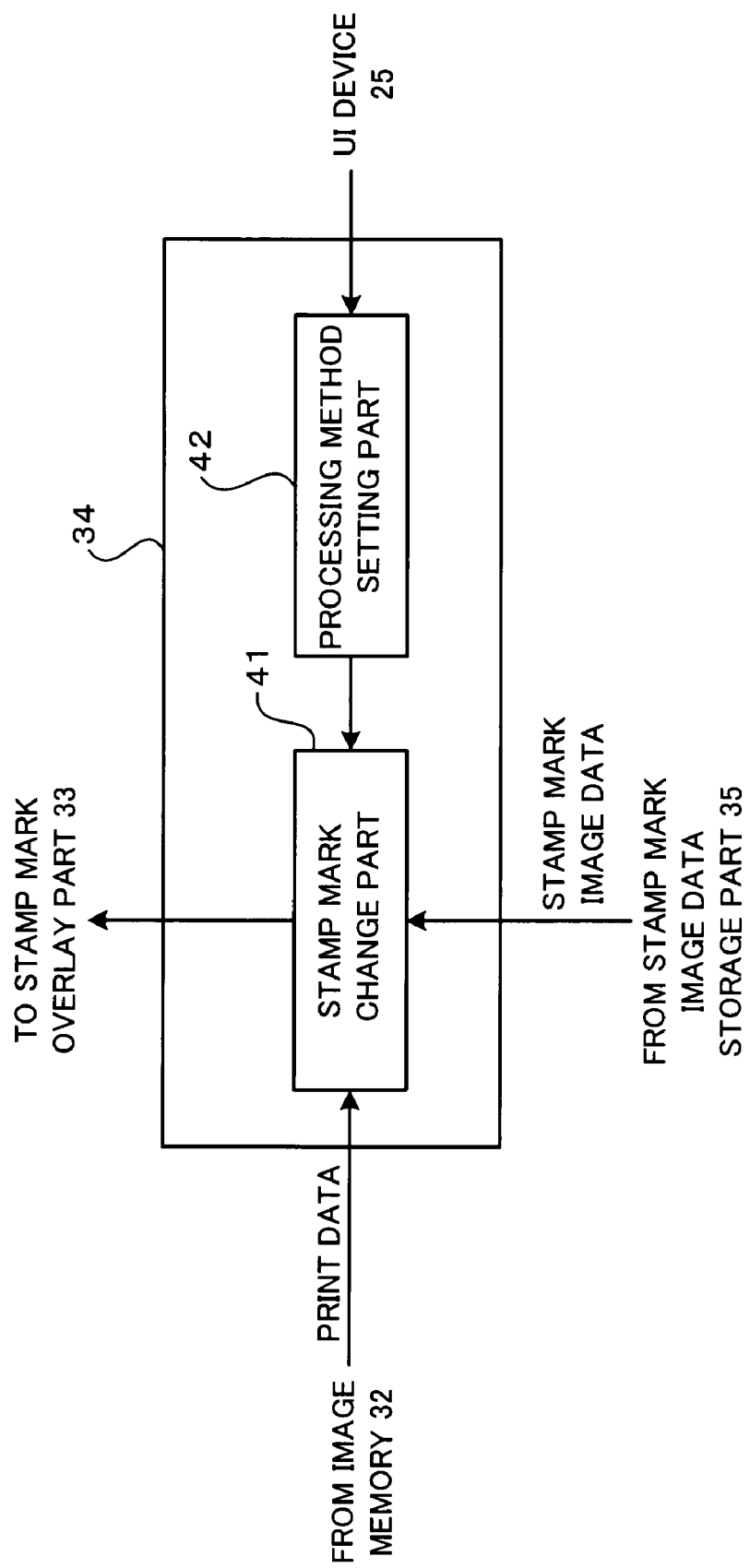
FIG. 7 is a block diagram showing a configuration of a boundary processor 34 in FIG. 6.

As shown in FIG. 7, the boundary processor 34 has a stamp mark change part 41 and a processing method setting part 42.

The processing method setting part 42 sets a processing method for changing pixels constituting a stamp mark image based on a user's instruction inputted from the UI device 25.

The stamp mark change part 41 changes pixels, existing within a predetermined range of respective pixels constituting print data, among pixels constituting the stamp mark image read from the stamp mark image data storage part 35, based on the processing method set by the processing method setting part 42.

Next, an operation of the image processing device 31 in the image forming apparatus 10 according to the present exemplary embodiment will be described in detail based on the drawings.

Figure 8:
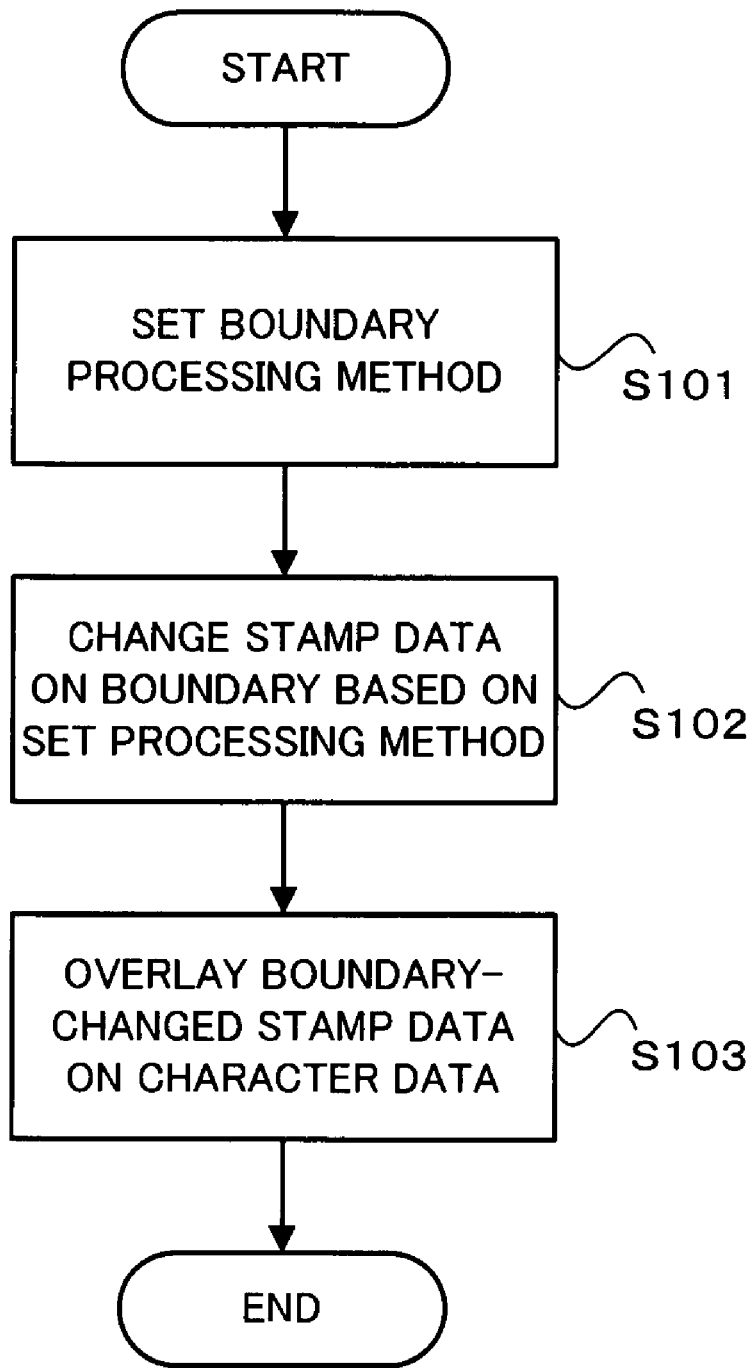
FIG. 8 is a flowchart showing an operation of an image processing device 31 according to the first exemplary embodiment of the present invention.

FIG. 8 is a flowchart showing the operation of the image processing device 31 according to the present exemplary embodiment.

First, when a stamp mark image is to be overlaid on print data, the processing method setting part 42 sets a boundary processing method for the stamp mark change part 41 based on the user's designation of the boundary processing method via the UI device 25 (step S101).

Figure 9:
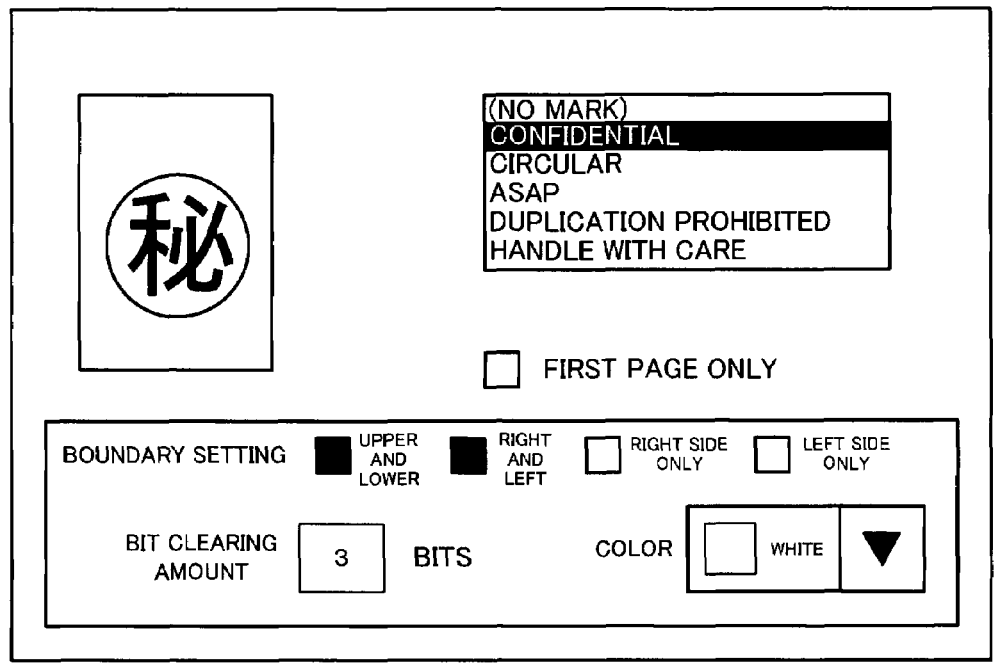
FIG. 9 is a display example on a UI device 25 when a method for processing the boundary between a stamp mark image and print data is set by a processing method setting part 42.
Figure 10:
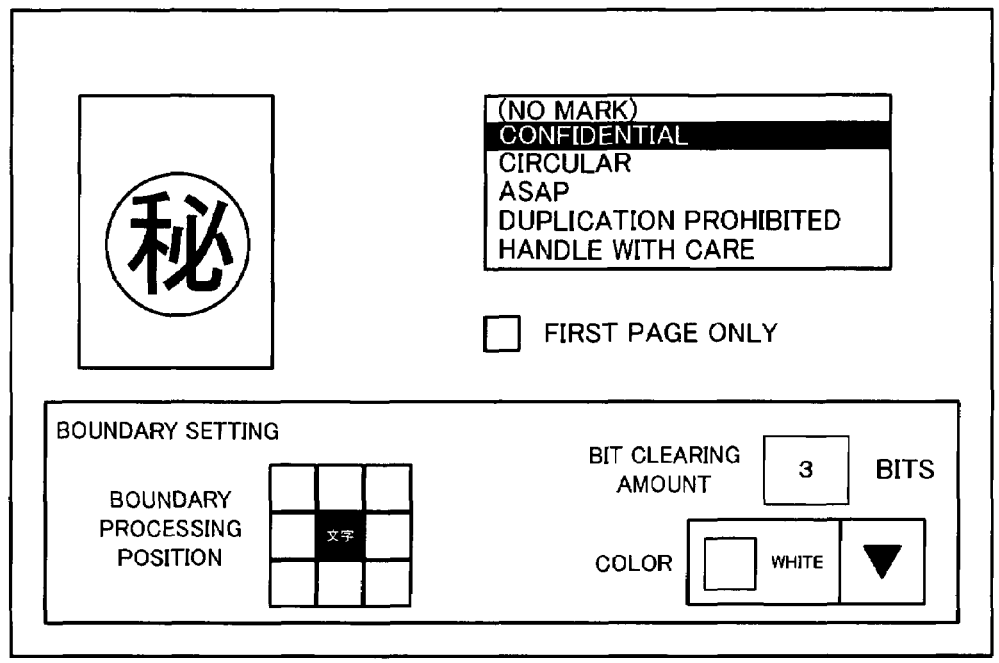
FIG. 10 is another display example on the UI device 25 when a method for processing the boundary between the stamp mark image and the print data is set by the processing method setting part 42.

FIGS. 9 and 10 show display examples on the UI device 25 when the processing method for processing the boundary between the stamp mark image and the print data is set by the processing method setting part 42.

In the display example shown in FIG. 9, when pixels of the print data and pixels of the stamp mark image overlap each other, the range of pixels among pixels of the print data, the number of bits for which pixels are to be cleared, and further, in the case of changing the color of the print data to another color, the color to be obtained, are selected. Note that in FIG. 9, setting is made to clear pixels for 3 bits in upward and downward directions and rightward and leftward directions with the print data pixel as a center. Note that to "clear" pixels means to set the density value of print data corresponding to the pixels to "0".

In the display example shown in FIG. 10, when pixels of the print data and pixels of the stamp mark image overlap each other, the number of bits for which pixels around the print data image are to be cleared, and further, the area to be cleared around the print data image, are selected.

Then, the stamp mark change part 41 changes the stamp data in the boundary portion based on the processing method set by the processing method setting part 42 (step S102).

Finally, the stamp mark overlay part 33 overlays the stamp mark data which has been subjected to the boundary change processing by the stamp mark change part 41 on the print data stored in the memory 32, and outputs the data to the image output part 36 (step S103).

Note that in the present exemplary embodiment, the boundary processing is performed on the stamp mark data and then the stamp mark data is overlaid on the print data.

However, the present invention is not limited to this arrangement. It may be arranged such that after the overlay of the stamp mark data on the print data, the pixels of the stamp mark data included within a predetermined range of the pixels of the print data are changed.

Figure 11:
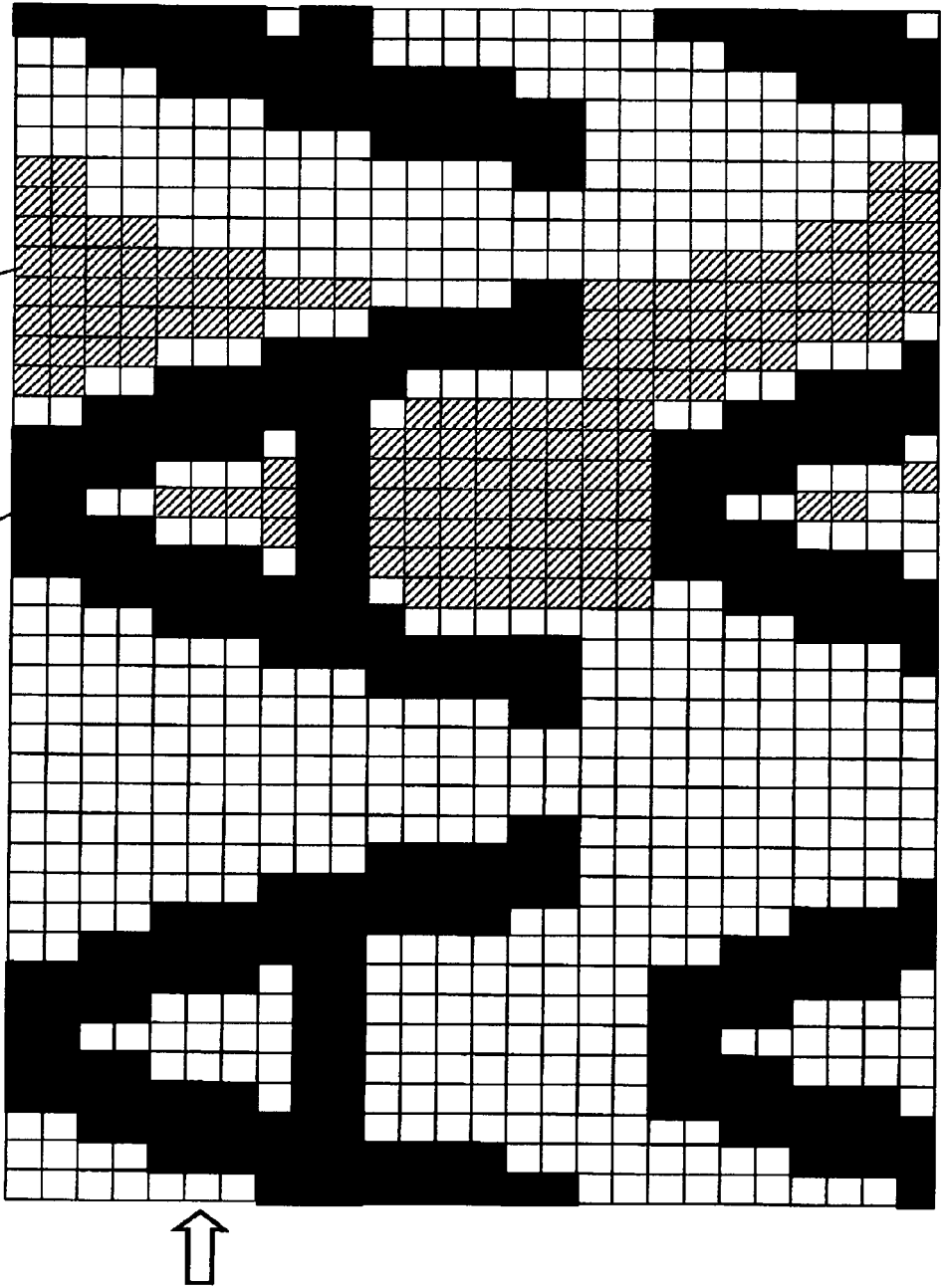
FIG. 11 is an enlarged view of an image in which the stamp mark image is overlaid on the print data in the first exemplary embodiment of the present invention.

FIG. 11 shows an example of an image on which the stamp mark image is overlaid on the print data. In the example shown in FIG. 11, the character data 60 is used as print data. In FIG. 11, the boundary processing is performed such that pixels for 1 bit in rightward and leftward directions to pixels constituting the character data 60 are changed to white pixels.

FIG. 12 shows the details of particular processing performed on a line indicated with an arrow in FIG. 11. In FIG. 12, portions in which the stamp mark data within a 1-bit range adjacent to the character data is changed to white are indicated with arrows.

In this manner, when the boundary processing is performed on pixels constituting the character data 60 only within the range of predetermined number of bits in the rightward and leftward directions, as the processing is performed by line, the amount of processing can be reduced. Further, as a memory having a storage capacity for 1-line image data such as a line memory can be used, the necessary memory capacity can be reduced.

Figure 13:
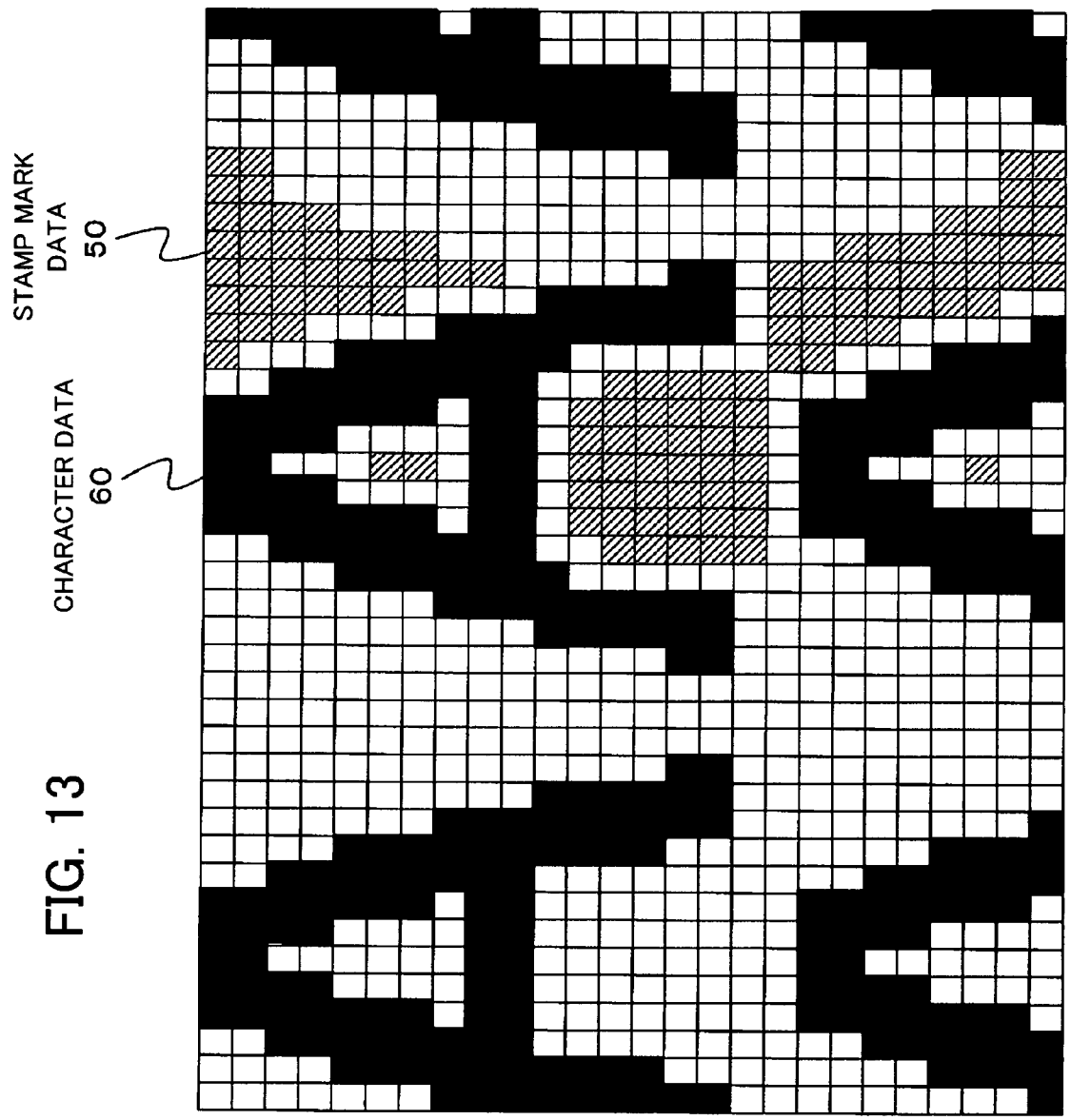
FIG. 13 is an enlarged view of another image in which the stamp mark image is overlaid on the print data in the first exemplary embodiment of the present invention.

Further, FIG. 13 shows another image example in which the stamp mark image is overlaid on the print data. In FIG. 13, the boundary processing is performed such that pixels for 1 bit around pixels constituting the character data 60 (rightward and leftward directions, upward and downward directions and diagonal rightward and leftward directions) are changed to white pixels.

Figure 14A:
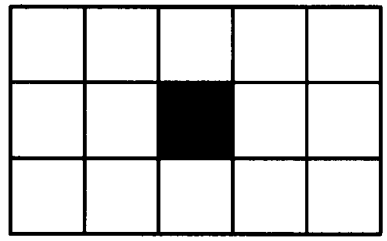
FIGS. 14A to 14D are explanatory views of the details of a processing method upon generation of the image shown in FIG. 13.
Figure 14B:
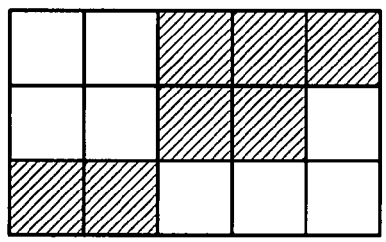
Figure 14C:
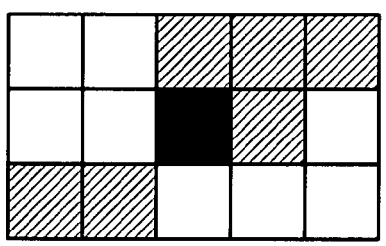
Figure 14D:
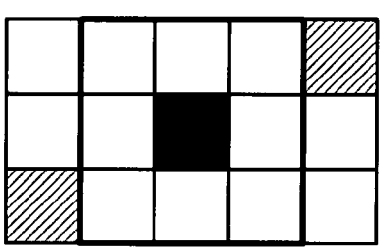

FIGS. 14A to 14D show the details of the processing method upon generation of the image example as shown in FIG. 13. Note that for the sake of simplification of explanation, the character data is constituted with pixels for 1 bit as shown in FIG. 14A. FIG. 14C shows the result of overlay such that the character data shown in FIG. 14A and the stamp mark data shown in FIG. 14B are overlaid with preference to the character data. In FIG. 14D, a 3×3 pixel filter with the character data as a center is formed and applied to the data in FIG. 14C, and pixels of the stamp mark data existing within the filter are changed to a white pixel.

In this manner, the 3×3 pixel filter is sequentially applied to the respective pixels of the character data, and the stamp mark data existing within the filter is changed based on the set processing method, thereby the boundary processing of changing the stamp data for 1 bit around the character data is realized.

As shown in FIG. 13 and FIGS. 14A to 14D, by changing the pixels of the stamp mark data 50 existing around the pixels of the character data 60, a boundary is formed between the character data 60 and the stamp mark data 50 in all the upward and downward directions, the rightward and leftward directions and the diagonal rightward and leftward directions.

Second Exemplary Embodiment

Next, the image forming system according to a second exemplary embodiment of the present invention will be described.

Figure 15:
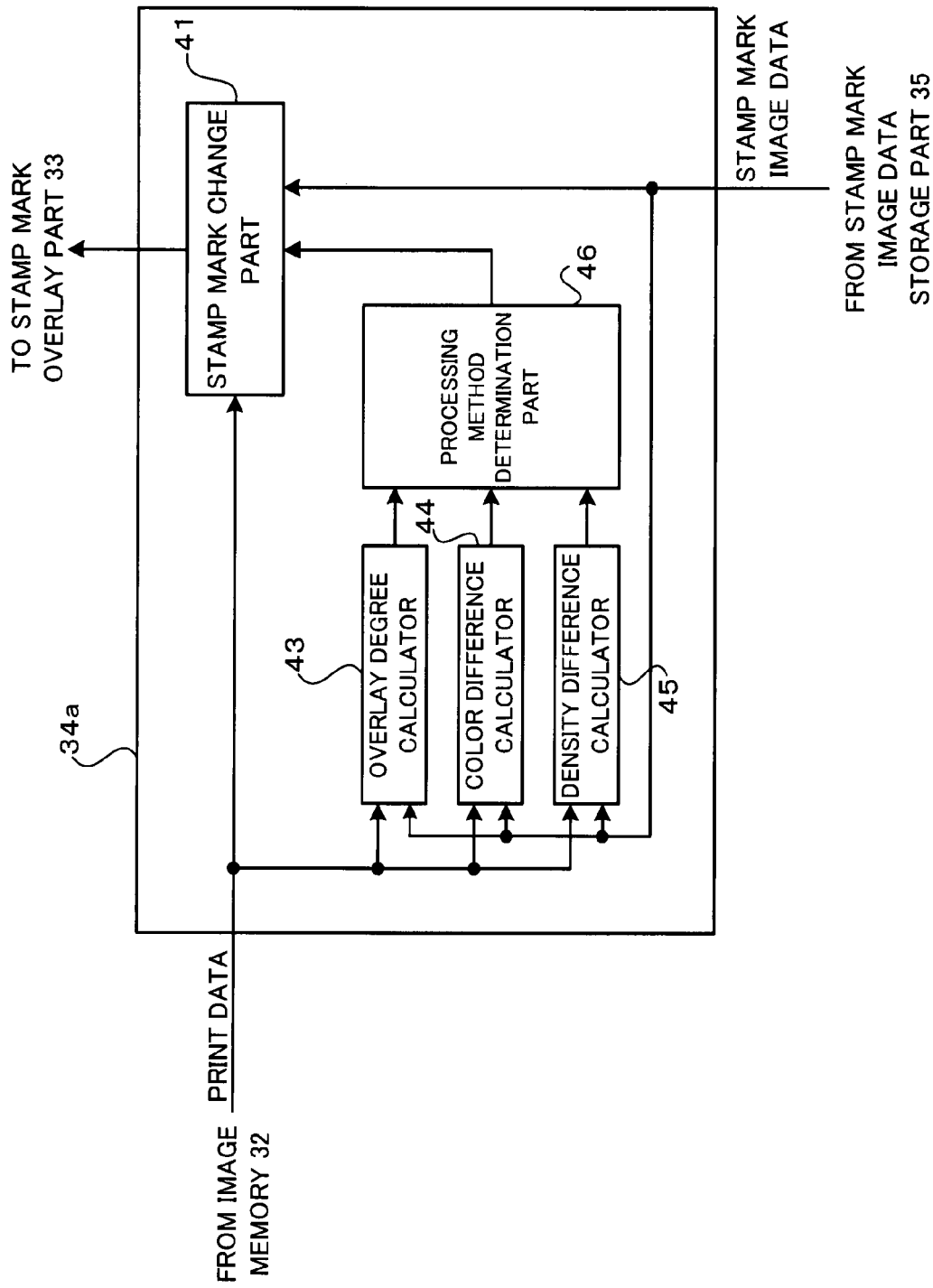
FIG. 15 is a block diagram showing a configuration of a boundary processor 34a in the image forming system according to a second exemplary embodiment of the present invention.

The image forming system according to the present exemplary embodiment is arranged such that, in the image processing device 31 of the image forming apparatus 10 shown in FIG. 6, the boundary processor 34 is replaced with a boundary processor 34a as shown in FIG. 15. In FIG. 15, the constituent elements corresponding to those in FIG. 7 have the same reference numerals and the explanations of the constituent elements will be omitted.

As shown in FIG. 15, the boundary processor 34a in the present exemplary embodiment has the stamp mark change part 41, an overlay degree calculator 43, a color difference calculator 44, a density difference calculator 45 and a processing method determination part 46.

The overlay degree calculator 43 calculates the degree of overlay between the print data and the stamp mark image data. More particularly, the degree of overlay between the print data and the stamp mark image data means the ratio of pixels, among the pixels constituting the stamp mark image, overlapped with the print data. For example, when 1000 pixels constitute the stamp mark image data and 500 pixels of the 1000 pixels are overlapped with the print data, the degree of overlay is expressed as 500 pixels/1000 pixels×100=50%.

The color difference calculator 44 calculates a color difference between the print data and the stamp mark image data. The density difference calculator 45 calculates a density difference between the print data and the stamp mark image data.

The processing method determination part 46 determines a processing method for changing pixels constituting the stamp mark image based on one or combined two or more of the type of stamp mark image (significance), the degree of overlay calculated by the overlay degree calculator 43, the color difference calculated by the color difference calculator 44 and the density difference calculated by the density difference calculator 45.

Then the stamp mark change part 41 according to the present exemplary embodiment changes the density or color tint of the pixels constituting the stamp mark image based on the processing method determined by the processing method determination part 46.

For example, the processing method determination part 46 determines a method for processing the boundary in the stamp mark image based on the significance of the stamp mark image using a table as shown in FIG. 16. Note that in the following description, character data is used as the print data.

In the table example shown in FIG. 16, when a stamp mark with high significance such as a division head seal or a company seal is selected, processing of changing pixels of the boundary in the stamp mark image is not performed. Regarding a "confidential" mark with low significance, a processing method to clear the stamp data (stamp mark image data) within 3 bits around the character data is selected. Further, regarding a "circular" mark or "reference" mark with intermediate significance, a processing method to clear the stamp data within 1 bit in the rightward and leftward direction from the character data is selected.

Further, for example, the processing method determination part 46 determines a method for processing the boundary in the stamp mark image based on the degree of overlay between the character data and the stamp data using a table as shown in FIG. 17.

In the table example shown in FIG. 17, when the degree of overlay between the character data and the stamp data is low, it is determined that the character data is not so illegible as a result of overlay of the stamp data, and the stamp data within 1 bit around the character data is cleared. It is determined that the character data is more illegible as the degree of overlay between the character data and the stamp data becomes higher, and the number of bits of the stamp data to be cleared is increased.

Further, for example, the processing method determination part 46 determines a method for processing the boundary in the stamp mark image based on a color difference between the character data and the stamp data using a table as shown in FIG. 18.

In the table example shown in FIG. 18, when the color difference between the stamp data and the character data is less than a predetermined value and is small, it is determined that the character data cannot be distinguished from the stamp mark image without difficulty, and the stamp data within 7 bits around the character data is cleared. When the color difference between the stamp data and the character data is equal to or greater than the predetermined value and large, it is determined that the character data can be easily distinguished from the stamp mark image, and the stamp data within 3 bits around the character data is cleared.

Further, for example, the processing method determination part 46 determines a method for processing the boundary in the stamp mark image based on a density difference between the character data and the stamp data using a table as shown in FIG. 19.

In the table example shown in FIG. 19, when the density difference between the stamp data and the character data is large, it is determined that the character data can be easily distinguished from the stamp mark image, and the number of bits to be cleared is reduced. When the density difference is small, it is determined that the character data cannot be distinguished from the stamp mark image without difficulty, and the number of bits to be cleared is increased.

Third Exemplary Embodiment

Next, the image forming system according to a third exemplary embodiment of the present invention will be described.

Figure 20:
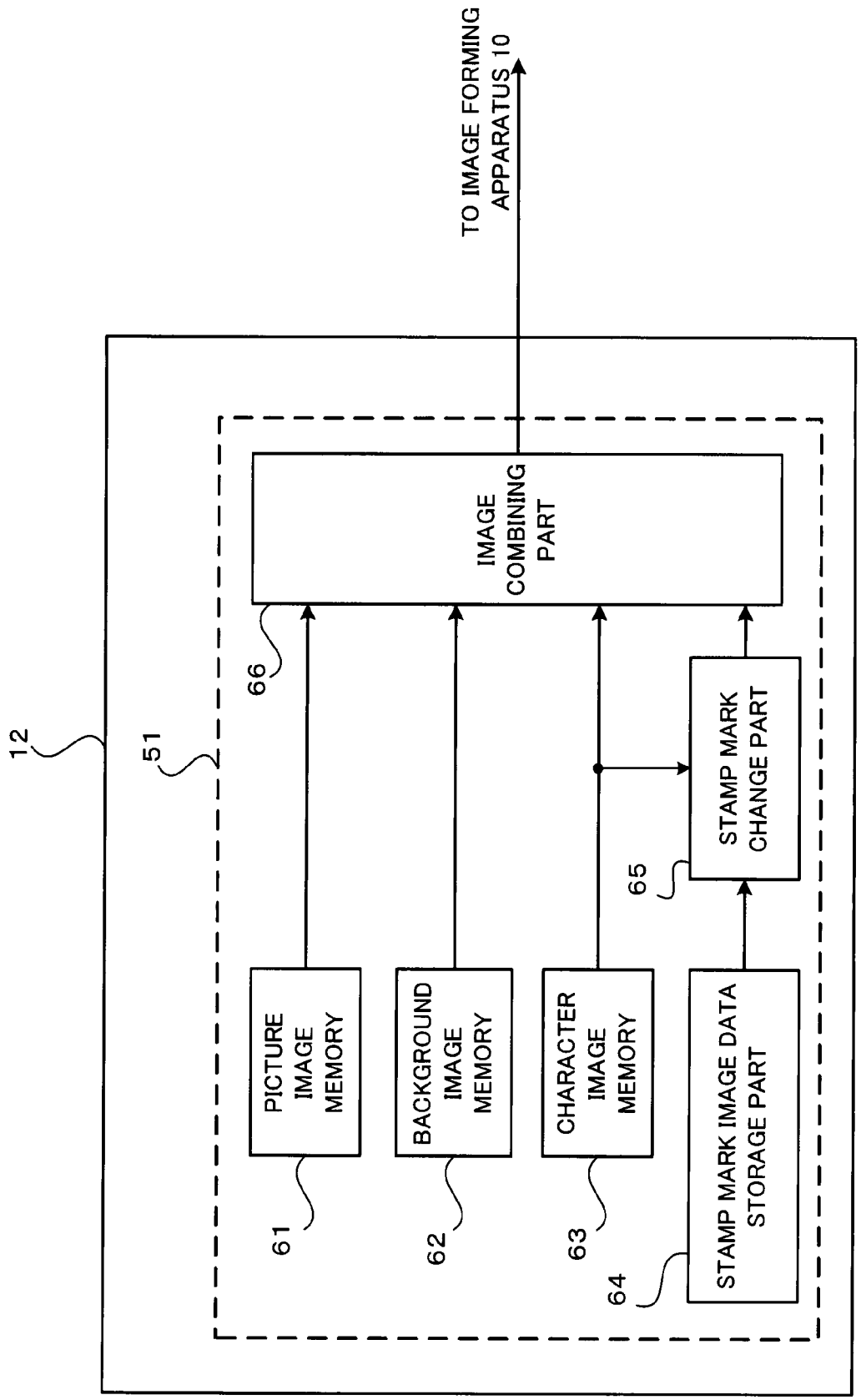
FIG. 20 is a block diagram showing a configuration of a terminal device 12 in the image forming system according to a third exemplary embodiment of the present invention.

The image forming system according to the present exemplary embodiment is arranged such that, in the system configuration as shown in FIG. 4, an image processing device 51 as shown in FIG. 20 is provided in the terminal device 12.

As shown in FIG. 20, the image processing device 51 has a picture image memory 61, a background image memory 62, a character image memory 63, a stamp mark image storage part 64, a stamp mark change part 65, and an image combining part 66.

The picture image memory 61, the background image memory 62, the character image memory 63 store picture image data, background image data and character image data constituting an image.

The stamp mark image storage part 64 stores image data such as a "confidential" mark, a "duplication prohibited" mark, a "handle with care" mark and an "ASAP" mark.

The stamp mark change part 65 changes pixels, existing a predetermined range of respective pixels constituting character data stored in the character image memory 63, among pixels constituting a stamp mark image read from the stamp mark image data storage part 64, based on a set processing method.

The image combining part 66 combines the picture image data, the background image data and the character image data stored in the picture image memory 61, the background image memory 62 and the character image memory 63, with the stamp mark image data in which the pixels in the boundary with respect to the character image data have been changed by the stamp mark change part 65, and transmits the combined data to the image forming apparatus 10.

FIGS. 21 and 22 show image examples in which the stamp mark image is overlaid on the print data in this manner.

In the image example in FIG. 21, among pixels of the stamp mark data 50, pixels within a 1-bit range around the character data 60 are cleared. Accordingly, in FIG. 21, in the cleared area of the stamp mark data 50, the background image data 70 is print-outputted.

Further, in FIG. 22, among the pixels of the stamp mark data 50, the color of pixels within a 1-bit range around the character data 60 are replaced with pixels in white the same as the color of a print sheet. Accordingly, in FIG. 22, the color of the boundary between the character data 60 and the stamp mark data 50 is white the same as the color of the print sheet.

MODIFICATION

In the above-described first and second exemplary embodiments, although the stamp mark image is overlaid on the print data in the image processing device 31 provided in the image forming apparatus 10, the present invention is not limited to this arrangement. For example, when an image processor similar to the image processing device 31 is provided in the terminal device 12 to transmit a print job to the image forming apparatus 10, the stamp mark image can be overlaid on the print data the terminal device 12 side.

Further, in the above exemplary embodiments, although the stamp mark image is overlaid as additional information on image information such as print data, the present invention is not limited to this arrangement. The present invention is similarly applicable when additional information other than a stamp mark image is overlaid on image information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a storage unit that stores image information on which additional information is to be overlaid;
   a change unit that changes pixels, within a predetermined range of respective pixels constituting the image information, among pixels constituting the additional information, to pixels having a different density or color tint from a density or color tint of the image information and the additional information;
   an overlay unit that overlays the additional information changed by the change unit on the image information held in the storage unit; and
   a determination unit that determines a processing method for changing the pixels constituting the additional information based on a degree of overlay between the additional information and the image information,
   wherein the change unit changes a density or color tint of the pixels constituting the additional information based on the processing method determined by the determination unit.

2. An image processing apparatus comprising:
   a storage unit that stores image information on which additional information is to be overlaid;
   a change unit that changes pixels, within a predetermined range of respective pixels constituting the image information, among pixels constituting the additional information, to pixels having a different density or color tint from a density or color tint of the image information and the additional information;

an overlay unit that overlays the additional information changed by the change unit on the image information held in the storage unit; and a determination unit that determines a processing method for changing the pixels constituting the additional information based on a color difference between the additional information and the image information, wherein the change unit changes a density or color tint of the pixels constituting the additional information based on the processing method determined by the determination unit.

3. An image processing apparatus comprising:

a storage unit that stores image information on which additional information is to be overlaid;

a change unit that changes pixels, within a predetermined range of respective pixels constituting the image information, among pixels constituting the additional information, to pixels having a different density or color tint from a density or color tint of the image information and the additional information;

an overlay unit that overlays the additional information changed by the change unit on the image information held in the storage unit; and a determination unit that determines a processing method for changing the pixels constituting the additional information based on at least one or combined two of a type of the additional information, and a degree of overlay, a color difference and a density difference between the additional information and the image information, wherein the change unit changes a density or color tint of the pixels constituting the additional information based on the processing method determined by the determination unit.

4. An image forming system comprising:

an image processing apparatus having; a storage unit that stores image information on which additional information is to be overlaid; a change unit that changes pixels, within a predetermined range of respective pixels constituting the image information, among pixels constituting the additional information, to pixels having a different density or color tint from a density or color tint of the image information and the additional information; and an overlay unit that overlays the additional information changed by the change unit on the image information held in the storage unit; and an image output apparatus that outputs an image based on the image information, on which the additional information has been overlaid by the image processing apparatus, wherein the image processing apparatus further includes a determination unit that determines a processing method for changing the pixels constituting the additional information based on a degree of overlay between the additional information and the image information, and the change unit changes a density or color tint of the pixels constituting the additional information based on the processing method determined by the determination unit.

5. An image forming system comprising:

an image processing apparatus having: a storage unit that stores image information on which additional information is to be overlaid; a change unit that changes pixels, within a predetermined range of respective pixels constituting the image information, among pixels constituting the additional information, to pixels having a different density or color tint from a density or color tint of the image information and the additional information; and an overlay unit that overlays the additional information changed by the change unit on the image information held in the storage unit; and an image output apparatus that outputs an image based on the image information, on which the additional information has been overlaid by the image processing apparatus, wherein the image processing apparatus further includes a determination unit that determines a processing method for changing the pixels constituting the additional information based on a color difference between the additional information and the image information, and the change unit changes a density or color tint of the pixels constituting the additional information based on the processing method determined by the determination unit.

6. An image forming system comprising:

an image processing apparatus having: a storage unit that stores image information on which additional information is to be overlaid; a change unit that changes pixels, within a predetermined range of respective pixels constituting the image information, among pixels constituting the additional information, to pixels having a different density or color tint from a density or color tint of the image information and the additional information; and an overlay unit that overlays the additional information changed by the change unit on the image information held in the storage unit; and an image output apparatus that outputs an image based on the image information, on which the additional information has been overlaid by the image processing apparatus, wherein the image processing apparatus further includes a determination unit that determines a processing method for changing the pixels constituting the additional information based on at least one or combined two of a type of the additional information, and a degree of overlay, a color difference and a density difference between the additional information and the image information, and the change unit changes a density or color tint of the pixels constituting the additional information based on the processing method determined by the determination unit.

7. A computer readable medium storing a program causing a computer to execute a process for image processing, the process comprising:

determining a processing method for changing pixels constituting additional information to be overlaid on image information based on a degree of overlay between the additional information and the image information;

changing pixels, within a predetermined range of respective pixels constituting the image information, among pixels constituting the additional information, to pixels having a different density or color tint from a density or color tint of the image information and the additional information, based on the determined processing method; and overlaying the changed additional information on the image information.

8. A computer readable medium storing a program causing a computer to execute a process for image processing, the process comprising:

determining a processing method for changing pixels constituting additional information to be overlaid on image information based on a color difference between the additional information and the image information;

changing pixels, within a predetermined range of respective pixels constituting the image information, among pixels constituting the additional information, to pixels having a different density or color tint from a density or color tint of the image information and the additional information, based on the determined processing method; and overlaying the changed additional information on the image information.

9. A computer readable medium storing a program causing a computer to execute a process for image processing, the process comprising:

determining a processing method for changing pixels constituting additional information to be overlaid on image information based on a density difference between the additional information and the image information;

changing pixels, within a predetermined range of respective pixels constituting the image information, among pixels constituting the additional information, to pixels having a different density or color tint from a density or color tint of the image information and the additional information, based on the determined processing method; and overlaying the changed additional information on the image information.

10. A computer readable medium storing a program causing a computer to execute a process for image processing, the process comprising:

determining a processing method for changing pixels constituting additional information to be overlaid on image information based on at least one or combined two of a type of the additional information, and a degree of overlay, a color difference and a density difference between the additional information and the image information;

changing pixels, within a predetermined range of respective pixels constituting the image information, among pixels constituting the additional information, to pixels having different density or color tint from a density or color tint of the image information and the additional information, based on the determined processing method; and overlaying the changed additional information on the image information.

11. An image processing method comprising:

preparing image information on which additional information is to be overlaid;

changing pixels, within a predetermined range of respective pixels constituting the image information, among pixels constituting the additional information, to pixels having a different density or color tint from a density or color tint of the image information and the additional information;

overlaying the changed additional information on the prepared image information held in the storage unit; and determining a processing method for changing the pixels constituting the additional information based on a degree of overlay between the additional information and the image information, wherein a density or color tint of the pixels constituting the additional information is changed based on the processing method.

12. An image processing method comprising:

preparing image information on which additional information is to be overlaid;

changing pixels, within a predetermined range of respective pixels constituting the image information, among pixels constituting the additional information, to pixels having a different density or color tint from a density or color tint of the image information and the additional information;

overlaying the changed additional information on the prepared image information held in the storage unit; and determining a processing method for changing the pixels constituting the additional information based on a color difference between the additional information and the image information, wherein a density or color tint of the pixels constituting the additional information is changed based on the processing method.

13. An image processing method comprising:

preparing image information on which additional information is to be overlaid;

changing pixels, within a predetermined range of respective pixels constituting the image information, among pixels constituting the additional information, to pixels having a different density or color tint from a density or color tint of the image information and the additional information;

overlaying the changed additional information on the prepared image information held in the storage unit; and determining a processing method for changing the pixels constituting the additional information based on at least one or combined two of a type of the additional information, and a degree of overlay, a color difference and a density difference between the additional information and the image information, wherein the change unit changes a density or color tint of the pixels constituting the additional information based on the processing method.

* * * * *